United States Patent [19]

Kerekes et al.

[11] Patent Number: 4,486,491

[45] Date of Patent: Dec. 4, 1984

[54] NON-RICOCHETING ARMOR PANEL

[76] Inventors: Peter S. Kerekes, 134 Kirk Dr., Thornhill, Ontario, Canada, L3T 3L4; Wagdi Kaddis, 22 Trott Sq., Scarborough, Ontario, Canada, M1B 1V8; Alfred J. Hallal, 7235 Pierre Corneille, Montreal, Quebec, Canada H1M 1L3

[21] Appl. No.: 579,397

[22] Filed: Feb. 13, 1984

[51] Int. Cl.³ ................................................ B32B 7/00
[52] U.S. Cl. .................................... 428/251; 156/220; 156/297; 156/299; 156/307.3; 156/307.4; 428/911
[58] Field of Search ................ 428/251, 911; 156/166, 156/180, 181, 220, 297, 299, 307.4, 307.3, 307.5

[56] References Cited

U.S. PATENT DOCUMENTS

| | | | |
|---|---|---|---|
| 3,486,966 | 12/1969 | Allen et al. | 428/911 |
| 3,722,355 | 3/1973 | Hing | 428/911 |
| 4,048,365 | 9/1977 | Hoover | 428/911 |
| 4,090,005 | 5/1978 | Morgan | 428/911 |

*Primary Examiner*—James J. Bell

[57] ABSTRACT

A self-supporting, decorative, armor panel having: a central armor core consisting of layers of fiberglass bonded together with resin; an outer, decorative, non-ricocheting laminate on each side of the armor core. Each laminate has an outer, decorative cover layer and a plurality of paper layers bonded together with resin. In a process of making the same the laminates are bonded to the armor core simultaneously with the bonding together of all the layers.

10 Claims, No Drawings

NON-RICOCHETING ARMOR PANEL

This invention is directed toward a self-supporting, decorative, armor panel, and to a method of making the panel.

Self-supporting, armor panels such as bulletproof glass or metal plate are known. However these known panels are very costly. In addition, they are heavy, and difficult to work with. Many of the known armor panels also cause bullets fired at them to ricochet. The ricocheting bullets could rebound from the panels to injure people near them. Thus the panels do not protect as well as they should. Also, the known panels often have an unattractive appearance. Further manufacturing steps directed to improving their appearance must often be employed thus increasing the cost of the panels.

It is the purpose of the present invention to provide an improved, self-supporting, decorative armor panel which is relatively inexpensive, relatively light in weight, and which can be easily worked so that the panel can be used in many different structural applications. It is another purpose of the present invention to provide an improved armor panel which minimizes, or eliminates, the danger of ricochets thereby providing better protection. It is a further purpose of the present invention to provide an improved armor panel which can be obtained in different decorative colors and/or patterns so that the panel is attractive in appearance and can be matched to the decor of its place of use.

In accordance with the present invention, a self-supporting, decorative, armor panel is provided which has a central armor core made up of a plurality of fiberglass sheets bonded together with resin; and an outer decorative, non-ricocheting laminate on each side of the core. Each outer laminate is made up of an outer, decorative cover layer and a plurality of paper layers bonded together with resin. The outer laminates are simultaneously bonded to the core when the layers of the laminates and the core are bonded together.

The central armor core is made thick enough to stop a bullet from passing through it. The thicker the core, the more powerful a bullet it can stop. The outer, decorative laminates on the core help support the panel and also provide a smooth, hard, attractive outer skin. The cover layer of the laminates provides the decorative feature of the panel. In addition, the plurality of paper layers in the laminates allow good penetration of a bullet into the panel thus minimizing any ricocheting.

The layers of the laminates and of the core are bonded together with resin, simultaneously with the bonding together of the laminates and the core with resin, in single step in a heated high-pressure press. Thus the cost of manufacturing the panel is reduced making it relatively inexpensive. A layup is assembled from the various resin impregnated sheets and layers which form the outer decorative laminates and the central armor core. The layup is then inserted in a press where it is subjected to high pressure, and to heat, for a sufficient length of time to form a unitary panel structure having rigid, decorative, hard-surfaced, cover laminates sandwiching a rigid armor core.

The armor core structure itself, consisting of fiberglass layers bonded with resin, is well known as a good ballistic material as noted in the book "Fibrous Armor" by Roy C. Laible, on P's. 101 to 103. A laminate of woven fiberglass fabric layers bonded together with resing produces an excellent ballistic material. The laminate is relatively rigid but can be incorporated in clothing for example in the form of small wafers. However, the laminate does not have a suitable decorative finish; may not be rigid enough for certain structural purposes; and has a pronounced spalling effect when struck by bullets. In addition, there is a possibility of ricochets.

It is also known to use the fiberglass laminate with a ceramic cover layer adhesively fixed to one side of the laminate to provide protective armor as noted in the Kirk-Othmer "Encyclopedia of Chemical Technology", second edition, supplement vol., P's. 138–157. However the manufacture of this structure is quite complicated and thus the structure is expensive. In addition, the ceramic covered structure has a pronounced spalling effect.

The armor panel of the present invention avoids the deficiencies of the known panels in providing an attractive, self-supporting, structural panel that is easily manufactured in one step. The panel not only is armor protective but also, because of its laminate covers minimizes ricocheting. In addition, the spalling effect is held to acceptable levels.

The invention is particularly directed toward a self-supporting, decorative armor panel having a central armor core consisting of layers of fiberglass bonded together with resin and an outer, decorative, nonricocheting laminate on each side of the core. Each laminate comprises an outer, decorative cover layer and a plurality of paper layers bonded together with resin. The laminates are bonded to the core simultaneously with the bonding together of all the layers.

The invention is also particularly directed toward a method of making a self-supporting, decorative armor panel comprising making a layup of a central armor core consisting of a plurality of fiberglass layers interspersed with resin, and an outer laminate on each side of the core consisting of an outer decorative resin-impregnated cover layer and a plurality of resin-impregnated paper layers; placing the layup in a press; and subjecting the layup to a pressure in the press exceeding 700 p.s.i., and a temperature of about 140°–180° C., until the layers are bonded together in a unitary structure: whereby the temperature in the layup exceeds about 125° C. for at least about 5–10 minutes to bond these layers together.

The self-supporting armor panel of the present invention has a first resin-inpregnated cover layer on one side of the panel overlying a first plurality of resin-impregnated paper layers to form one outer laminate. A second resin-impregnated cover layer on the other side of the panel overlying a second plurality of resin-impregnated paper layers forms the other outer laminate. A plurality of layers of fiberglass, impregnated with a resin, form the armor core and are sandwiched between the first and second plurality of resin-impregnated paper layers. All the layers are bonded together by the resin into a unitary structure.

The first and second cover layers on the outer sides of the panel are decorative and each comprises a single paper sheet impregnated with a suitable resin. The paper employed is preferably Alpha paper having a basis weight of 40–120 lbs./3000 sq. ft. The resin employed is preferably melamine resin and the paper sheet is impregnated with this resin to a pick-up of 35–55% based on the weight of the impregnated paper.

Each paper layer in the first and second plurality of resin-impregnated paper layers comprises a single resin-impregnated paper sheet. The paper employed is Kraft paper having a basis weight of between 90–150 lbs./3000 sq. ft. The resin employed is a phenolic resin and the paper sheets are impregnated with this resin to a pick-up of at least 27% based on the weight of the impregnated sheets.

In the armor core, woven fiberglass of a plain weave is used with a weight of about 500 g/m². This fiberglass is impregnated with a resin, preferably phenolic or melamine to a minimum of 15% resin content based on the weight of the impregnated sheet.

The various layers are assembled in a press and subjected to heat and high pressure to form a rigid panel. The first and second plurality of resin impregnated paper layers in the outer laminates give the panel some of its rigidity, and also provide a hard, smooth outer "skin" on the panel. A sufficient number of layers must be used to provide this "skin". Between 10 and 50 layers would be sufficient on each side of the fiberglass layers forming the core. The fiberglas layers, combined with resin, provide the armor protection of the panel, a sufficient number of layers are used to provide the desired level of protection. For example, for protection against small caliber weapons, such as a 9 mm Luger pistol, eighteen pieces of fiberglass fabric would be used. For protection against stronger weapons, the number of sheets of fiberglass layers are increased.

If the cover layers in the outer laminates are other than a solid color, it may be advisable to cover them with an overlay layer. The overlay layer comprises an Alpha paper having a basis weight of between 20 and 30 lbs./3000 sq. ft. impregnated with a resin, preferably melamine, to a pickup of at least 50% based on the weight of the impregnated sheet. The overlay layers are assembled on the outside of the two cover layers in the press.

By way of example, an armor panel suitable for protection against small arms, such as a 9 mm Luger pistol, is formed by first assembling the following layup:
1 sheet of melamine resin-impregnated overlay
1 sheet of melamine resin-impregnated decorative cover
16 sheets of phenolic resin-impregnated kraft paper
18 pieces of melamine resin-impregnated fiberglass fabric
16 sheets of phenolic resin-impregnated kraft paper
1 sheet of melamine resin-impregnated decorative cover
1 sheet of melamine resin-impregnated overlay.

The layup is assembled between stainless steel caul plates and loaded into a press where it is pressed under high pressure and heat. The pressure during pressing is maintained between 800 and 1000 p.s.i., and the temperature is maintained at about 150° C. until the temperature inside the layup exceeds about 135° C. for at least 10 minutes. After sufficient curing, the press is cooled and the finished armor panel is removed. The armor panel formed in the press has a thickness of about one-half inch and weighs close to five lbs per sq. ft. The central armor core in the panel has a thickness of about one-quarter inch after pressing, and the outer laminate, between which the core is sandwiched, each has a thickness of about one-eighth of an inch.

The armor panel produced is rigid and self-supporting with a hard, smooth outer skin and it can be provided in a wide variety of decorative colors and/or patterns. The panel can be easily cut, drilled, sawn, and otherwise worked for use in a great range of applications. The panels can be provided in a range of standard structural sizes up to a maximum width of 60 inches.

The panel resists complete penetration from small caliber firearms. The projectiles lodge in the panel without penetrating right through and without ricocheting or serious spalling.

For protection against more powerful firearms, the thickness of the panel, and more particularly its central armor core, can be increased. For another example, the central armor core can be made from fifty-four pieces of resin-impregnated fiberglass fabric to produce an armor core in the finished panel that is about three-quarters of an inch thick. The total thickness of the panel would be about an inch. This panel would resist penetration by bullets from a .30 M1 carbine for example.

A panel having an armor core made from ninety pieces of resin-impregnated fiberglass fabric would produce a finished core about one and a quarter of an inch thick in a panel one and a half inch thick. This panel would resist penetration by bullets from a .308 Winchester for example.

While the pieces of fiberglass fabric and the resin do not alone have good armor properties, the two materials together produce a synergistic effect providing a core made from them with good armor properties. Of course a sufficient thickness of material must also be provided.

The outer laminates of the panel should be at least about 1/16 of an inch thick to provide the required support and hard "skin" for the panel, however thicker laminates can be used.

In an alternative construction, the armor core can be constructed from pieces of fiberglass fabric interleaved with layers of resin carriers. The layers of resin carriers each would comprise two sheets of paper. Each sheet of paper preferably is an alpha paper having a basis weight of between 20 and 30 lbs./3000 sq. ft. Each sheet of paper is preferably impregnated with a phenolic or melamine resin to a pick-up of 60 to 70% based on the weight of the impregnated sheet. The fiberglass layers comprises pieces of woven fiberglass fabric as before, the fabric being a plain weave with a weight of about 500 g/m².

An armor panel incorporating the above core, suitable for protection against small arms, is formed by assembling the following layup:
1 sheet of melamine resin-impregnated overlay
1 sheet of melamine resin-impregnated decorative cover.
16 sheets of phenolic resin-impregnated Kraft paper
19 pairs of sheets of melamine resin carrier interleaved with 18 pieces of fiberglass fabric 16 sheets of phenolic resin-impregnated kraft paper
1 sheet of melamine resin-impregnated decorative cover
1 sheet of melamine resin-impregnated overlay The layup is assembled and pressed under heat as before to form an armor panel having a thickness of about one-half inch and a weight of about five lbs./sq.ft. While alpha paper has been used for the resin carriers in the armor core, kraft paper, at the same or higher basis weight could also be used.

In another alternative construction, the armor core could be constructed without the resin carriers, and every second piece of fiberglass fabric would be impregnated with resin to a pickup of about 30%. The impregnated sheets are alternated with unimpregnated or raw pieces of fiberglass fabric.

Other grades or styles of fiberglass fabric may be suitable as long as the weave is relatively open. The resins employed can be either phenolic or melamine. It is to be understood that the resins used are thermosetting.

We claim:

1. A self-supporting, decorative, armor panel having: a central armor core consisting of layers of fiberglass bonded together with resin; an outer, nonricocheting laminate on each side of the core, each laminate comprising an outer, decorative cover layer and a plurality of paper layers bonded together with resin; the laminates bonded to the core simultaneously with the bonding together of all the layers.

2. A self-supporting, decorative armor panel having in sequence: a resin-impregnated decorative cover sheet; a plurality of resin-impregnated paper sheets; a plurality of fiberglass sheets with resin dispersed through the sheets; a plurality of resin-impregnated paper sheets; and a resin-impregnated, decorative, cover sheet; the sheets all bonded together by the resin to form a unitary structure.

3. An armor panel as claimed in claim 1 wherein the central armor core includes layers of resin carriers interleaved with the layers of fiberglass.

4. An armor panel as claimed in claim 3 wherein each layer of resin carrier comprises two sheets of resin-impregnated paper, and each layer of fiberglass comprises a woven piece of fiberglass fabric.

5. An armor panel as claimed in claim 1 wherein each outer layer is at least 1/16" thick to provide the necessary support and hard outer layer for the panel, and wherein the central armor core is at least ¼" thick to provide the necessary minimum armor protection.

6. A self-supported decorative armor panel having in sequence: a resin-impregnated decorative cover sheet; a plurality of resin-impregnated paper sheets; a plurality of resin carriers interleaved with fiberglass sheets; a plurality of resin-impregnated paper sheets; and a resin-impregnated decorative cover sheet; the sheets and carriers all bonded together by the resin to form a unitary structure.

7. An armor panel as claimed in claim 6 wherein the resin carriers comprise pairs of resin-impregnated paper sheets.

8. An armor panel as claimed in claim 7 including an overlay sheet bonded with resin to the outer surface of each cover sheet.

9. An armor panel as claimed in claim 6 wherein the thickness of each plurality of bonded paper sheets at least 1/16", and wherein the thickness of the bonded, interleaved resin carriers and fiberglass sheets is at least ¼".

10. A method of making a self-supporting, decorative, armor panel comprising: making a layup of a central armor core consisting of a plurality of fiberglass layers interspersed with resin, and an outer laminate on each side of the core consisting of an outer decorative resin-impregnated cover layer and a plurality of resin impregnated paper layers; placing the layup in a press; and subjecting the layup to a pressure in the press exceeding 700 p.s.i., and a temperature of about 140°–180° C. until the layers are bonded together in a unitary structure.

* * * * *